Aug. 28, 1962  D. L. SCHWARTZ  3,051,566
PROCESS FOR PRODUCING HIGH DENSITY REFRACTORY BODIES
Filed Jan. 20, 1959  4 Sheets-Sheet 1

INVENTOR.
DONALD L. SCHWARTZ,
BY
ATTORNEY.

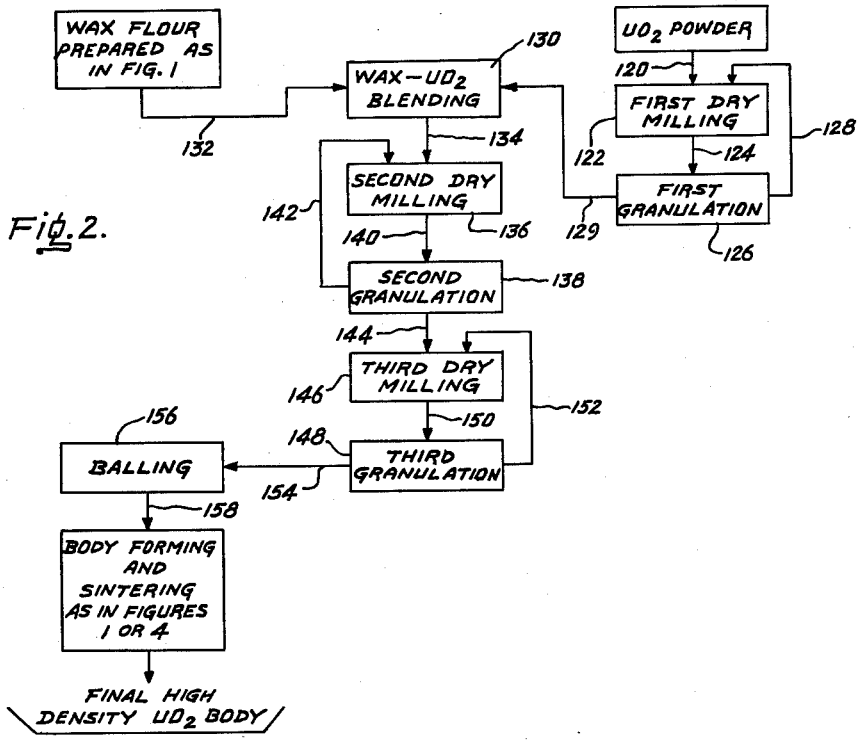
Fig. 2.
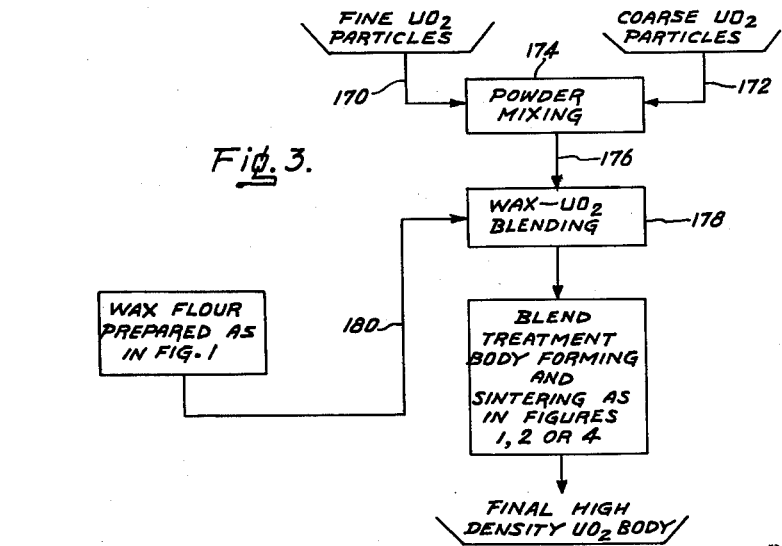
Fig. 3.
INVENTOR.
DONALD L. SCHWARTZ,
BY 
ATTORNEY.

Aug. 28, 1962 D. L. SCHWARTZ 3,051,566
PROCESS FOR PRODUCING HIGH DENSITY REFRACTORY BODIES
Filed Jan. 20, 1959 4 Sheets-Sheet 3
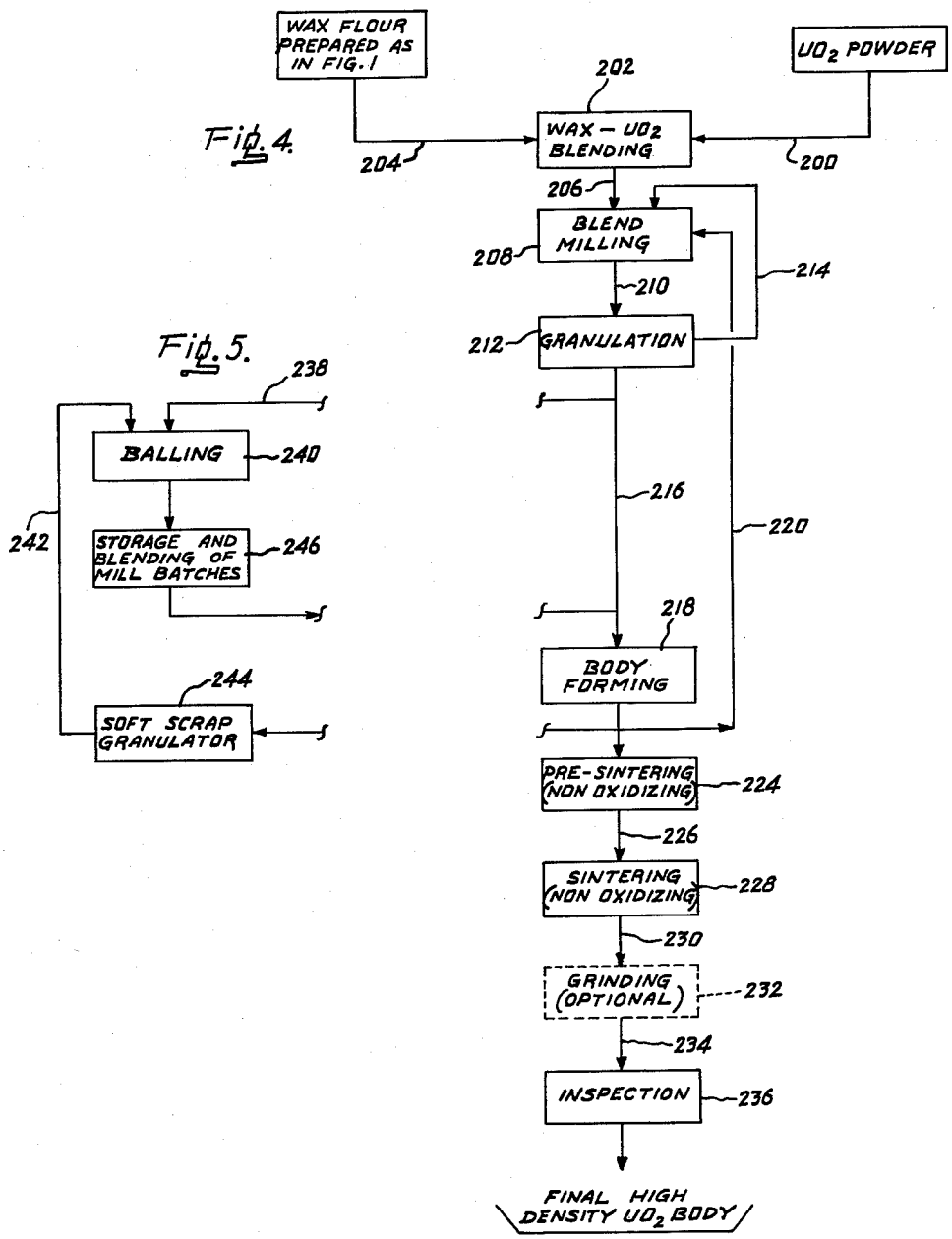
INVENTOR.
DONALD L. SCHWARTZ,
BY
ATTORNEY.

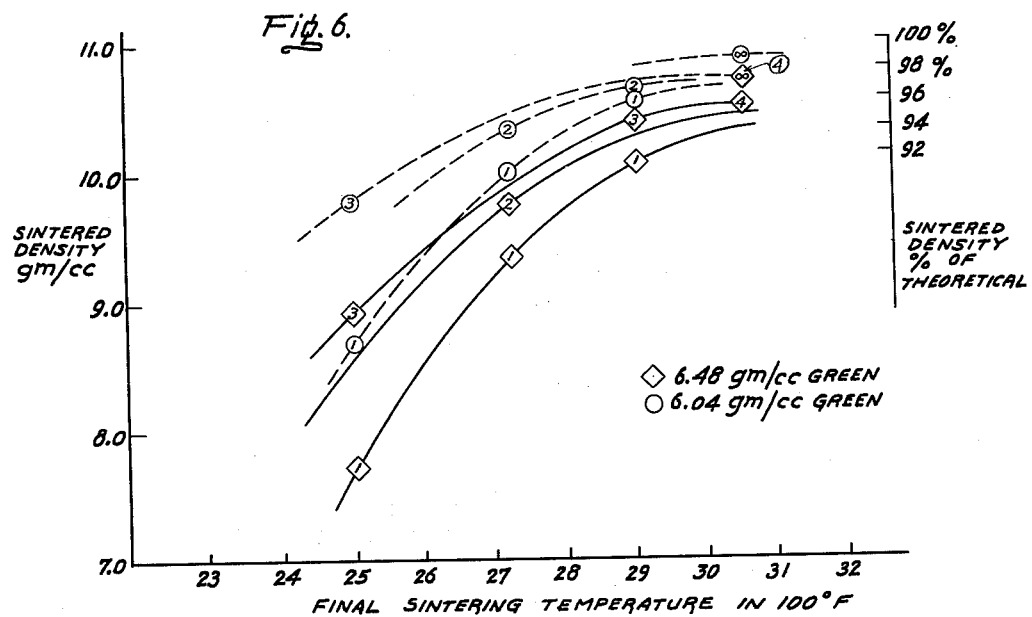
Fig. 6.
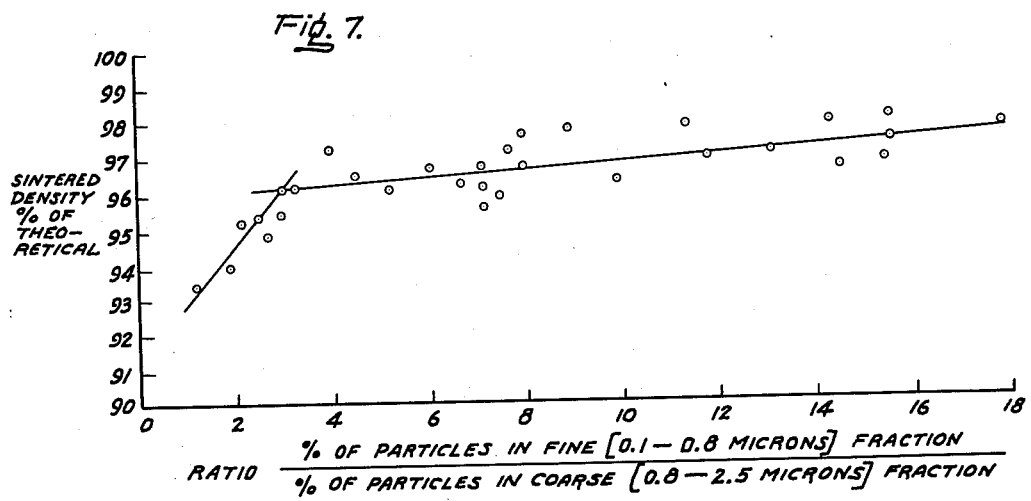
Fig. 7.
INVENTOR.
DONALD L. SCHWARTZ,
BY
ATTORNEY United States Patent Office 3,051,566
Patented Aug. 28, 1962

3,051,566
PROCESS FOR PRODUCING HIGH DENSITY REFRACTORY BODIES
Donald L. Schwartz, Detroit, Mich., assignor to General Electric Company, a corporation of New York
Filed Jan. 20, 1959, Ser. No. 787,848
20 Claims. (Cl. 75—213)

This invention relates to an improved process for the production of solid bodies of near-theoretical maximum density from powdered high melting point materials and in particular it relates to the production of such bodies from the refractory metals and from the oxides, carbides, silicides, hydrides, nitrides, borides, and other refractory compounds of uranium, plutonium, thorium, and other metals at reduced pressures and temperatures without the necessity of added contaminant densifying agents.

High density bodies of high melting point elements and compounds thereof are useful in many known applications. There are countless uses for high density refractory or high melting point metals or compounds such as grinding and cutting agents, wear resistent surfaces, thermal and electrical insulating and structural materials, and the like.

One particular use in which such materials are highly desirable is in construction of nuclear reactors. High density compounds of thorium, uranium, plutonium, and other fissionable and fertile elements are much preferred to lower density materials as nuclear fuels. This preference is due to the fact that the number of fissionable or fertile atoms per unit volume is greater in the high density material. For a given neutron flux, the probability of capture of a neutron in the nucleus of a fissionable or fertile atom to result in a fission event or the production of a fissionable atom is proportionately higher. The atomic concentration, on an atom per unit volume basis, is usually highest when the atom is in the elemental state. For example, the concentration of uranium atoms in uranium metal is about 91 percent higher than the concentration of uranium atoms in uranium dioxide ($UO_2$) at its theoretical maximum density of 10.968 gm./cc.[1] (grams per cubic centimeter) at 79° F.

However, several characteristics of the metals make them less desirable as nuclear fuels than the refractory compounds. For example, uranium metal is quite reactive chemically. In water-moderated or water-cooled nuclear reactor, contact of this metal with the water can lead to undesirable corrosion and the possibility of dangerously exothermic chemical reactions. Hence such uranium fuel elements are clad with a corrosion-resistant cladding. Metallic uranium is in addition subject to rather severe irradiation damage; the metal distorting excessively during prolonged irradiation to assume radically different shapes from the original state. The melting points of the metals are generally substantially lower than the melting points of some compounds of these metals such as the oxides, carbides, and the others mentioned herein. This melting point thus becomes a limitation on the rate at which heat can be liberated in a metallic nuclear fuel without melting it. It is thought by some that melting of the fuel is responsible for fission product release and an increase in the incidence of failure of clad fuel elements. For these and other reasons the aforementioned chemically and physically stable, high density, high melting point refractory or ceramic compounds of uranium, plutonium, and thorium are much preferred as nuclear fuels to the elemental or metallic forms in spite of their somewhat lower fuel atom concentration.

[1] National Bureau of Standards Circular No. 568 (February 20, 1956), page 25.

High density refractory or ceramic compounds of metals other than those listed above are useful as materials for construction of the non-fuel portions of a nuclear reactor. For example, the refractory compounds of lead are good high temperature gamma ray shield materials. The metallic borides and the refractory compounds of cadmium, dysprosium, gadolinium, samarium, hafnium, europium, erbium, silver, mercury, and the other known elements having high non-fission neutron capture cross-sections are excellent nuclear reaction control poison materials. The refractory compounds of beryllium and the refractory carbides and hydrides are good neutron moderating materials. In each case, the highest possible densities of these various materials are most desirable.

However, since these refractory compounds have in most cases very high melting points, desired shapes at high density are not producible by melting and casting. Heretofore, fabrication of solid bodies of these materials has involved the heat treating of pressed bodies of powder, but maximum densities above about 94 percent of theoretical maximum density, based on the crystal structure of the material, have been unattainable without the use of added densifying agents which contaminate the final product.

It is accordingly an object of this invention to provide an improved process for producing high density bodies of high melting point materials from powdered refractory or ceramic materials and which have finished densities approaching 100 percent of theoretical density and without the addition of contaminant densifying agents.

A further object of this invention is to overcome difficulties previously encountered in the production of such refractory bodies from the commercially available powdered raw materials.

An additional object is to overcome problems of the prior process involving the introduction and removal of a temporary lubricant and binder material which serves to maintain the shape of the green or unsintered body during handling prior to heat treatment.

It is also an object of this invention to provide for the pre-treatment of the powdered raw material in order to effect a substantial reduction in the required pressures applied to the powder-binder mixture in the formation of the green or unsintered body.

Other objects and advantages of the present invention will become apparent to those skilled in the art as the description and illustration thereof proceed.

Briefly, the present invention comprises a process for producing high density bodies from powdered high melting point material which comprises maintaining the ratio of the number of 0.1 to 0.8 micron particles to the number of 0.8 to 2.5 micron particles in the powdered material at a value of at least about 3.0, blending this powdered material with a lubricant-binder and treating to form a free flowing mixture having a substantially consistent fill density of at least about 23 percent of the theoretical density of the material, forming from this mixture a green or unsintered solid body having a density of at least about 40 percent of the theoretical density, presintering the unsintered body at a relatively low temperature to remove the lubricant-binder without disturbing or contaminating the solid body, and finally sintering the thus-treated body at a relatively high temperature below the melting point to shrink the body to a predetermined size and produce the sintered solid material having a density ranging between about 94 and 100 percent of the theoretical maximum. The powdered material may originally contain agglomerates of individual solid particles larger than about 2.5 microns and these are broken down or deagglomerated and thoroughly dispersed from one another to maintain the particle ratio given above. Less than 4 percent of any particles larger than 2.5 microns are maintained in the powdered material. The present invention also includes novel steps for producing a fine powdered lubricant-binder flour from a paraffin wax base material including the steps of refrigerating the paraffin to increase brittleness, and subdividing the embrittled paraffin by grinding or grating to produce a wax flour or powder which is readily mixed within the powdered refractory material to produce a blend from which the green unsintered bodies are formed.

Various embodiments and modifications of the present invention, as well as the critical limitations in the process, will be more readily understood by reference to the accompanying drawings in which:

FIGURE 2 is a similar diagram showing another embodiment of this invention;

FIGURE 3 is a diagram indicating a third embodiment of this invention;

FIGURE 4 is a diagram showing a fourth embodiment of this invention;

Figure 1:
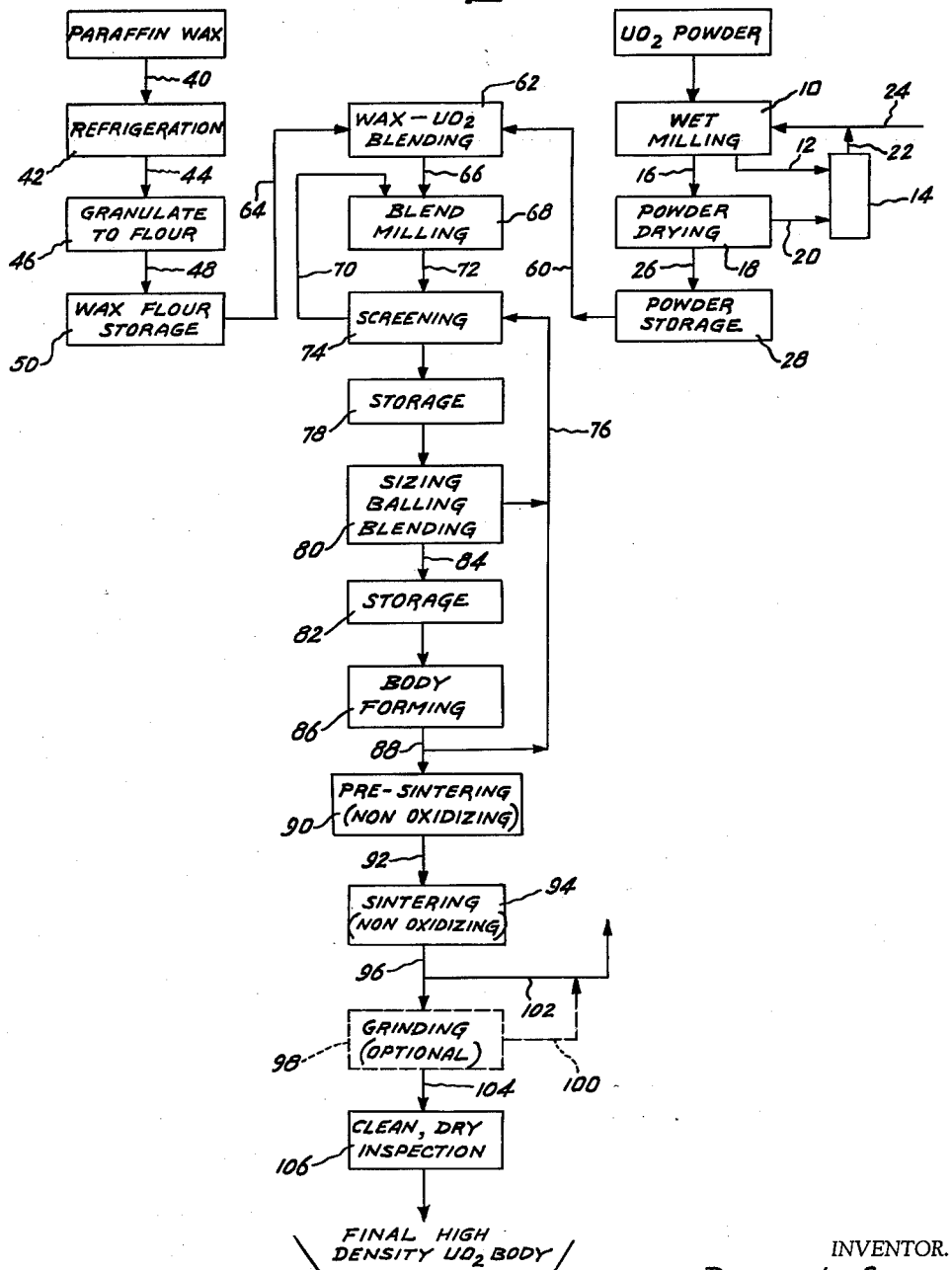
FIGURE 1 is a diagram indicating the sequence of operations and the steps in one embodiment of the process of this invention.

FIGURE 5 indicates a modification of the FIGURE 4 embodiment;

FIGURE 6 is a graphical presentation of experimental data showing the effect of sintering time and sintering temperature upon the final density of the refractory or ceramic body; and FIGURE 7 is a graphical presentation of experimental data indicating the critical effect of the ratio of the number of particles in each of two particle size ranges on the final sintered density of the refractory or ceramic bodies produced therefrom.

Following descriptions of FIGURES 1 through 6 are conducted in terms of specific examples of several embodiments of the present invention applied in the production of high density bodies of uranium dioxide from commercailly available powder. It should be understood that the modifications subsequently described in connection with FIGURES 2, 3, 4, or 5 may be combined with certain steps indicated in the other figures, the choice depending largely upon the nature of the powder which is available from commercial sources and the pre-treatment it requires. The data given in FIGURE 7 apply to the several embodiments shown. It should also be understood that the embodiments described are also applicable to processing of other refractory or ceramic powdered materials as hereinafter described.

Referring now more particularly to FIGURE 1, commercial uranium dioxide powder containing particles ranging in size from below about 0.1 micron to well above 2.5 microns in average dimension and containing particularly large agglomerates of individual particles is introduced in the wet milling zone 10. A milling medium such as acetone is introduced into the mill in an amount ranging from about 1.0 to about 2.0 pounds per pound of uranium dioxide powder. Suitable mills and milling procedures are subsequently described. Between about 2 and about 8 pounds of grinding balls per pound of uranium dioxide powder have been found satisfactory. The material is milled for a period sufficient to break down particle agglomerates and disperse particles from one another in the liquid milling medium, the actual time being dependent upon the type of feed powder and the type of milling equipment used. The deagglomerated powder is discharged from the mill, the liquid which is readily separable is re-cycled through line 12 into storage zone 14. The moist powder is introduced through line 16 into powder drying zone 18 from which further amounts of liquid are removed through line 20 to storage zone 14. The liquid is recirculated through line 22 into milling zone 10 together with make-up liquid introduced through line 24. The dried uranium dioxide powder in deagglomerated form is conveyed through line 26 into powder storage zone 28 in which, preferably, a plurality of uranium dioxide powder mill batches are blended to produce an aliquot mix.

In the present invention, a paraffin wax base material has been found to be the preferred lubricant-binder for use in the process of the present invention. Paraffin wax material is a normally solid, highly paraffinic or straight chain hydrocarbon having from about 15 to over 30 carbon atoms per molecule produced in the refining of petroleum, particularly the refining of waxy lubricating oil fractions. The specifications for a typical refined wax are shown in the following table.

*Table 1*

REFINED PARAFFIN WAX

| | |
|---|---|
| Melting point (ASTM), ° F | 122–124. |
| Color, Saybolt | 25–30. |
| Flash point, ° F | 295. |
| Penetration: | |
| At 32° F | 16. |
| At 77° F | 22. |
| At 115° F | 221. |
| Saponification value | 0. |
| Acid value | 0. |
| Viscosity at 212° F | 39. |
| Structure | Crystalline. |
| Specific gravity, gm./cc | 0.88–0.915. |

The paraffin wax as received is introduced through line 40 into refrigeration zone 42 where it is refrigerated sufficiently to embrittle it, that is to temperatures below about −25° F. This may be done conveniently by immersing the wax in a bath of acetone and Dry Ice which has a temperature of below about −100° F., by packing in Dry Ice, or by any other convenient refrigerating means for embrittling the wax. The refrigerated embrittled wax then passes through line 44 into granulation or grating zone 46 in which it is pulverized under refrigerated conditions to produce a wax flour which will pass through a 40 mesh screen. The granulation equipment may be refrigerated, by any convenient means known to those skilled in the art, to temperatures within the same range as those given above with respect to refrigeration zone 42. One convenient means for refrigeration involves the intermittent or simultaneous granulation of solid carbon dioxide or Dry Ice along with the embrittled paraffin wax. The through 40 mesh wax flour is discharged through line 48 into refrigerated wax flour storage zone 50. Storage at temperatures of between about +10° F. and +50° F. have been found sufficient to avoid coalecence of the wax flour.

The use of such solid paraffin wax flours as a binder in the refractory powder sintering process of this invention has been found to be extremely effective. Its introduction in the form of a refrigerated powder rather than as a solution in an organic liquid solvent or as a molten liquid has been found to overcome the principal difficulties heretofore encountered in the use of wax as a binder. Heating of the uranium dioxide powder is unnecessary. The refrigerated wax flour is readily metered into the system at the rates desired in proportion to the uranium dioxide powder. The solvent recovery problems previously encountered are avoided.

Deagglomerated uranium dioxide powder is introduced through line 60 into wax-uranium dioxide powder blending zone 62 together with wax flour introduced through line 64. The actual proportions used depend upon the surface area exposed by the uranium dioxide powder particles. With the smaller particles which expose a larger surface area per unit weight, the paraffin content is increased. Also, the necessary amount of wax binder varies with the kind of forming process used to produce the unsintered refractory bodies. For example, the paraffin content is somewhat higher when the unsintered bodies are formed by extrusion than they are when a pellet press operation is used to form them. In general, for the kinds of powdered materials referred to herein, the wax concentration in the mixture of wax flour and uranium dioxide will range between about 0.5 percent to about 10 percent by weight. For the specific example here described, about 5 percent wax flour by weight is completely effective to press form pellets of uranium dioxide.

The uniform mixture of wax flour and uranium dioxide powder is discharged from blending zone 62 through line 66 into milling zone 68. The grinding balls are introduced into the mill by means 70. The mixture is ball milled at a temperature which is about equal to and preferably slightly above the melting point of the wax binder, such as about 130° F. This temperature can usually be maintained by the heat of milling. The milling step serves to break down powder agglomerates, disperse the paraffin thoroughly in the mixture, and to precompact the powder mixture to a cake form on the mill wall. This dispersed mixture is discharged with the mill balls through line 72 into screening and sizing zone 74, into which soft unsintered scrap is also introduced via line 76. In screening zone 76 these materials are treated further at about 130° F. to break up the mill cake and the soft scrap to form generally irregular shaped particles and fine particles and separate the mill balls which are returned via line 70. The screened powder is discharged into storage zone 78 where it is held at about 130° F. Powder is drawn from zone 78 into sizing, balling, and blending zone 80 where various mixtures of individual mill batches are subjected to the mixing operation to blend the batches into a uniform mixture. The mixture is then agitated by tumbling and rolling and passed through a screen at about the wax melting point to form uniformly sized, generally spherical re-agglomerates having a fill density greater than about 2.5 gm./cc. or 23 percent of theoretical density. The fine particles are agglomerated into the spherical particles. This material is then held in storage zone 82 preparatory to formation of the green unsintered uranium dioxide bodies.

At this stage the treated mixture comprises uranium dioxide powder, having the required numerical ratio of fine to coarse particles, mixed with the paraffin lubricant-binder and re-agglomerated into small generally spherical shaped granules formed in the screening steps by the rolling, tumbling, and vibrating action at a temperature of about 130° F. This "balling" step may be facilitated by the presence of residual quantities of the liquid milling medium such as acetone, or the presence of benzene in the paraffin binder, etc., the quantities being only sufficient to moisten the powder mixture slightly. The balling operation reduces the amount of very fine particles present and produces a mixture which is primarily spherical re-agglomerates of about the size of the openings used in the screening step. This increases flowability and facilitates control of the fill density preferably to between about 3.5 and about 4.0 gm./cc., or between 27 percent and 37 percent of theoretical density.

The blended powder mixture is introduced via conveyor 84 into body forming zone 86 in which a pellet press is used to produce cylindrical pellets approximately 0.7 inch in diameter and 0.7 inch long. In the pellet press, the applied pressure is adjusted to be sufficient to compact the powdered material to a controlled soft density between about 5.9 and 7.0 gm./cc., or between about 54 percent and 64 percent of theoretical density. The green unsintered pellets are conveyed by means 88 from the press. Soft scrap, such as crack or chipped pellets, are returned as previously described via line 76 for re-granulation.

The green unsintered pellets are packed in refractory containers, which may or may not also contain finely divided particles of refractory packing material. The green pellets are then introduced into presintering zone 90 and are slowly heated from atmospheric temperature at a rate not exceeding about 50° F. per minute to a presintering temperature between about 400° F. and 900° F. to insure total removal of the paraffin wax base lubricant-binder. A maximum presintering temperature in the 700° to 900° F. range is very satisfactory with the uranium dioxide pellets of this example, when the pre-sintering operation is conducted in an oxygen-free atmosphere. In a vacuum operation, as subsequently described, temperatures in the 400° to 700° F. range are satisfactory. Careful control of the time and temperature are necessary at this stage in order to avoid incomplete paraffin removal which results in deposition of carbonaceous residues in the interior and on the surface of the pellet and cracking of the pellet due to the escape of vapor phase products produced in heating the binder-containing pellets in either the presintering or sintering zones 90 or 94. The thus presintered pellets are conveyed by means 92 into final sintering zone 94. In this zone is maintained an oxygen-free atmosphere such as one of the several types referred to below. Here the temperature is raised at a rate not exceeding about 175° F. per minute to a final sintering temperature between about 2750° F. and 3250° F. which is held for a period of between about 30 and about 250 minutes. Under these conditions, the pellet assumes virtually its maximum theoretical density.

The pellets are removed from sintering zone 94 and cooled at a rate not greater than about 175° F. per minute. The finished pellets are inspected to separate hard scrap, which includes fully sintered chips and any broken pellets, and the remaining pellets are conveyed by means 96 to an optional grinding zone 98. Here a centerless grinder, for example, may be employed to adjust the diameter of the sintered pellets to any desired final value. Hard scrap produced during the grinding is removed by means 100 and combined with hard scrap previously separated from the sintering furnace effluent in line 102. This material may be treated to recover the uranium dioxide for recycling in the process. The final product pellets are conveyed by means 104 into final inspection zone 106 where they are cleaned, dried, sized, and further inspected for quality control. These pellets produced from uranium dioxide powder have densities, as determined by conventional liquid immersion techniques, in the range of 94 percent to 100 percent of the maximum theoretical density.

The sintering of uranium dioxide as described above was also found to remove oxygen in excess of the stoichiometric amount. Powders having atom oxygen to uranium ratios as high as 2.10 produced sintered pellets having oxygen to uranium ratios of exactly 2.00. Further, sintering was found to effect a substantial reduction in impurities such as fluorine, boron, copper, nickel, and chromium. Weight losses on sintering varied generally up to about 0.7 percent, with losses of from about 0.4 percent to about 0.7 percent being associated with the sintering of thoroughly deagglomerated powders to densities greater than 94 percent of theoretical. Weight losses below about 0.4 percent were characteristic of the "as received" powders containing agglomerates and sintered densities of 90 percent of theoretical and below.

Although in body forming zone 86 a specific type of green unsintered body formation by pellet pressing was described, it should be understood that other forming operations may be substituted such as standard pressing, extrusion, pressing, isostatic pressing, compression molding, and machine formation to form varied shapes such as rods, plates, tubes, and others.

The following tabular data concisely illustrate the effect upon final sintered density of using deagglomerated powder with a fine to coarse ratio above 3.0 compared with using agglomerated powder "as received" with a ratio well below 3.0. The data are for uranium dioxide.

Table II
COMPARISON OF UO₂ POWDER

|  | As Received | Deagglomerated |
|---|---|---|
| Fine/Coarse Ratio | <3 | >3 |
| Compacting Pressure, tons/sq. in | 20 | 20 |
| Sintering Temperature, °F | 2,800 | 2,800 |
| Sintering Time, Minutes | 180 | 180 |
| Resultant Pellet Density, gm./cc | 8.96 | 10.65 |
| Percent of Theoretical | 82.0 | 97.4 |

Referring now more particularly to FIGURE 2, a second embodiment of the present invention is shown in which a plurality of dry milling operations is conducted on the wide range uranium dioxide powder feed to the system, rather than the wet milling procedure incorporated in the embodiment of FIGURE 1. In FIGURE 2, the operations indicated and the various zones of operation described may be used to produce feed material for the body forming steps described in connection with zones 86 and 218 of FIGURES 1 and 4 respectively, including the subsequent steps therein.

The incoming uranium dioxide powder passes by means of line 120 into first dry milling zone 122, in which it is dry-milled without lubricant to effect deagglomeration, and is then discharged through line 124 into first granulation zone 126. Herein the grinding balls are separated and returned to zone 122 by means 128, which may be a conveyor, and the milled powder cake is granulated through a 20 mesh screen. The granulated material is then passed through line 128 into wax flour-uranium dioxide blending zone 130. A predetermined quantity of paraffin wax flour, between 3 percent and 6 percent by weight, prepared as described in connection with FIGURE 1, is introduced through line 132 and blended uniformly with the uranium dioxide powder in zone 130. This mixture is discharged through line 134 into second dry milling zone 136 where the blend of paraffin flour and uranium dioxide is re-milled followed by a second granulation in zone 138 into which the mixture is introduced through line 140. Again the grinding balls are separated and returned by means 142. The granulated material is discharged through line 144 into third milling zone 146 where it is finally milled a third time and granulated once again in third granulation zone 148 into which it is passed through line 150. The grinding balls are returned through line 152. The granulated mixture is passed by means 154 into balling zone 156 in which the granulated mixture is subjected to vibration, rolling, and shaking under controlled heating conditions at a temperature of approximately 130° F. in order to produce a free flowing powder mixture which gives a constant fill density of about 3.5 gm./cc., or about 32 percent of theoretical density, in a die cavity or other closed container. This material is discharged through line 158 and is subjected then to the body forming and other operations described in connection with zones 86 and 218 and subsequent operations described in FIGURES 1 and 4 respectively.

During each of the three milling operations in zones 122, 136, and 146, the powder builds up and precompacts as a layer or cake on the inner wall of the mill thus separating from the grinding balls. The balls are thus readily separable from the compact and returned for re-use. The compact is readily shaken from the mill walls and subjected to the granulation steps described. The density of the compact powder built up on the mill wall depends upon temperature, speed of the mill, ball load, powder load, and type of powder.

Referring now more particularly to FIGURE 3, a third embodiment of this invention is shown in which two types of uranium dioxide powder of different particle size are used. Specifically, a fine type in which the percentage of 0.1-0.8 micron particles is very high is introduced through line 170 and a coarse type in which the percentage of 0.8-2.5 micron particles is very high is introduced through line 172 into powder blending zone 174. The relative proportions of these two particle size fractions have been found to be critical with respect to their effect upon the fill and green density, forming pressure, and the final sintered density of the products. This criticality is further described in connection with FIGURE 7. The two powder types described are deagglomerated, the individual particles are dispersed and thoroughly mixed in zone 174 to provide a mixture having a fine to coarse fraction ratio greater than 3.0. This mixture is discharged through line 176 into the lubricant blending zone 178. Paraffin wax flour, produced as previously described in connection with FIGURE 1, is introduced into zone 178 where the binder and uranium dioxide powder mixture are thoroughly blended. This powder-binder blend may be passed directly to the body forming steps of zone 86 in FIGURE 1 or zone 226 in FIGURE 4, or it may be subject to milling and granulation steps as described in connection with FIGURE 1 beginning with zone 68, FIGURE 2 beginning with zone 136, or FIGURES 4 or 5 beginning with zone 208. If desired, the powder mixing in zone 174 and powder-wax flour blending in zone 178 can be effected simultaneously in a single operation. However, the wax flour must be added carefully to avoid agglomeration of the wax.

Referring now more particularly to FIGURE 4, a further embodiment of the present invention is shown in which the essential steps of the process of this invention are reduced to their minimum number. Uranium dioxide powder is introduced through line 200 into blending zone 202. Paraffin wax flour, prepared as described in connection with FIGURE 1, is also introduced into zone 202, where a uniform blending of the wax flour and uranium dioxide powder is achieved. The blended mixture is then discharged through line 206 into milling zone 208 in which it is milled and deagglomerated at a temperature approximating 130° F. to produce a blend having the particle size ratios above about 3.0 as described below in connection with FIGURE 7. Heat generated in milling is usually sufficient to maintain this temperature, although separate heating means may be employed. The deagglomerated particles are precompacted forming a cake on the mill walls. The cake is discharged through line 210 onto a shaker screen in granulation zone 212. Here the grinding balls are separated and returned by means 214 and the compact is granulated through a 20 mesh screen under temperature conditions controlled near the wax binder melting point of about 130° F. to produce a granulated material having a fill density of about 2.5 gm./cc. or about 23 percent of theoretical density, or higher.

The granulated material is discharged through line 216 into body forming zone 218 where the powder is pressed to a controlled soft density of from about 5.9 to about 7.0 gm./cc. or between about 54 percent and about 64 percent of theoretical. Any soft scrap is returned via line 220 to milling zone 208 for re-treatment. The green pellets are then transferred to the presintering or deparaffinizing zone 224. The pellets are heated slowly to a temperature of about 850° F. at a rate not exceeding 50° F./minute in any of the oxygen-free atmospheres subsequently described. The pellets are treated at 850° F. for a period of between about 10 and about 30 minutes to volatilize and remove all of the paraffin binder. The deparaffinized pellets are then transferred by means 226 to sintering zone 228 in which they are heated at a rate below about 175° F. per minute in an oxygen-free atmosphere to final sintering temperatures ranging from about 2750° F. and about 3250° F. for a period from about 30 minutes to about 250 minutes. The sintered pellets are discharged from sintering zone 228 by means of line 230 and allowed to cool. The cooled pellets are ground as necessary in optional grinding zone 232 to desired outside diameter and conveyed via line 234 to final inspection zone 236, and in this form are the desired high density production. Product pellet densities range from about 94 percent to 100 percent of theoretical density.

FIGURE 5 shows a modification which can be made in the embodiment described in connection with FIGURE 4. In FIGURE 4, lines 216 and 220 are eliminated. The granulated material from zone 212 is introduced via line 238 into balling zone 240 in which the material is subjected to rolling and vibration in the balling operation as described in connection with FIGURE 1 to ensure coating all wax particles with uranium dioxide powder, to increase the bulk density, and provide a free flowing mixture of generally spherical particles. The material thus treated is discharged into storage and batch blending zone 246 in which several millings are blended to produce a uniform mixture of powder having a constant fill density of from about 3.4 to about 3.9 gm./cc. or between about 31 percent and about 36 percent of theoretical. The uniform mixture is then fed at the rate required into body forming zone 218 as described in FIGURE 4. Any soft scrap produced is separated and is regranulated in regranulating zone 244 to produce through 40 mesh granulated material which is conveyed through line 242 to balling zone 240.

Referring now to FIGURE 6, the experimental data showing the variation of sintered uranium dioxide pellet density with sintering temperature and time are shown. The numbers enclosed in the points on the graph are the sintering times in hours. The percent of theoretical maximum uranium dioxide density is indicated on the right ordinate while the actual pellet densities are indicated at the left ordinate. The solid lines drawn through the diamond-shaped points indicate the sintered density variation of pellets whose green density was 6.48 gm./cc. The circular points give corresponding data for pellets whose green density was 6.04 gm./cc. It should be noted that within the range of 6.0 to 6.5 gm./cc. for pressed green pellets, the higher final sintering densities are obtained from green pellets having the lower green density. Sintered densities in the range of 94 to 100 percent of theoretical are obtained at sintering temperatures of about 3100° F. and sintering times of from one hour to about 75 hours. The 75-hour points are indicated in FIGURE 6 as infinite time, since beyond this time no density increase was noted.

These data indicate that green unsintered densities in the range of from about 6 to about 6.5 gm./cc., preferably nearer 6 gm./cc., are necessary in the practice of this invention to produce uranium dioxide pellets of maximum density from pellet pressed shapes. When an extrusion press is used to form the green shapes, green densities as low as about 5.0 gm./cc., or about 40 percent of theoretical, can be used and still produce sintered product densities of near theoretical if the fine to coarse fraction ratio is above 3.0. Further, maximum sintering temperatures of at least about 2750° F. are necessary to produce maximum sintered densities approaching 100 percent of theoretical with sintering times in the range of from 30 to 250 minutes, and without added densifying agents.

The general effects of time and unsintered density on the final sintered density expressed as percent of theoretical, also apply to the other refractory materials named herein when final sintering temperatures appropriate to each materials are used.

Referring finally to FIGURE 7, experimental data are shown indicating the variation of the final sintered density of refractory bodies, prepared according to this invention, as a function of the particle size distribution in the deagglomerated refractory powder. The particle size distribution is expressed as a ratio of the percent of fine particles by count falling in the range of 0.1 to 0.8 micron average dimension to the percent of coarse particles by count falling in the range of 0.8 to 2.5 micron average dimension as determined by counting under a light microscope all particles larger than 0.1 micron and averaging at least 10 samples of a given powder. Particles below 0.1 micron are present and beneficial in this invention, but their number was found to have no critical adverse effect upon final product density. Particles over 2.5 microns do have such an adverse effect when their number rises about 4 percent by count of all particles above 0.1 micron, and accordingly, the powders preferably have less than this percentage of such large particles. For example, when the powder has 70 percent particles of 0.1–0.8 micron and 30 percent particles of 0.8–2.5 microns, the ratio is 70/30 or 2.3; when the powder has 80 percent particles of 0.1–0.8 micron, 16 percent particles of 0.8–2.5 microns, and 4 percent particles over 2.5 microns, the ratio is 80/16 or 5.0.

The data in FIGURE 7 were determined using deagglomerated batches of commercial refractory powder. Particle size ratios were determined by counting the particles in samples of the powder under a light microscope at 1100× using an oil immersion lens. Each batch of powder, following determination of the fine to coarse ratio, was mixed with 5 percent by weight of through 40 mesh paraffin flour, the mixture was blended in a ball mill for 420 seconds to form the cake, the cake was granulated through a 20 mesh screen and subjected to a balling operation to produce a mixture having a fill density in the range of from 23 percent to 37 percent of theoretical. The balled material was sampled and again checked for particle size ratio. Individual pellets were then pressed from each batch to a green density of from 54 percent to 64 percent of theoretical. The green pellets were deparaffinized at 850° F. for 20 minutes and then sintered at 3000° F. for a period of 120 minutes in a non-oxidizing hydrogen atmosphere. These pellets were allowed to cool and were subjected to density determinations according to conventional liquid immersion techniques. The densities thus determined were plotted against the fine to coarse particle ratio as shown in FIGURE 7.

In FIGURE 7 a definite and sharp change of slope is apparent in the curve, the break point being at a fine to coarse particle ratio of about 3.0. When the concentration of the coarse particles rises so that the ratio is less than about 3.0, a rapid decline in the final sintered density results. When the coarse particle concentration is sufficiently low so that the ratio is above about 3.0, gradually rising final sintered densities above about 94 percent of theoretical are obtained with increasing values of the ratio between values of about 3 and 18.

Accordingly, refractory powder deagglomeration is required in the practice of the present invention, and the realization of sintered densities in the range of 94 to 100 percent of theoretical is found to be dependent upon control of the fine to coarse particle ratio at values greater than about 3.0. This ratio control may be achieved by blending appropriate quantities of a powder containing a high percentage of 0.1 to 0.8 micron particles and a powder containing a high percentage of 0.8 to 2.5 micron particles to maintain the ratio above 3.0. This ratio may also be controlled by milling the feed powder for a time sufficient to reduce the agglomerates and larger particles to sizes within the 0.1 to 2.5 micron range and then, if necessary, adjusting the ratio of the two named fractions by milling or fractionating the material further. Such milling and solid fractionation procedures are well known chemical engineering operations and any such procedures may be employed as required to maintain the ratio at values greater than about 3.0 in order to assure a final sintered density between 94 percent and 100 percent of the theoretical values.

The preceding description of FIGURES 1 through 6 has been restricted to several illustrative examples of the process of this invention applied to the production of sintered uranium dioxide shapes of between 94 percent and 100 percent of theoretical density. Following is a general discussion of the various key operations and considerations in the practice of this invention in the production of sintered shapes of near theoretical density from other refractory materials such as those referred to herein.

PROCESSING OF COMMERCIAL REFRACTORY POWDERS

The other refractory powders mentioned herein are customarily manufactured in batches. These different batches or lots vary widely in discrete particle size distribution and more importantly in the presence of agglomerates of solid particles. The agglomerates, made up of finer discrete particles bonded together, must be broken down into particles primarily below 2.5 microns in average dimension and the particles dispersed from one another if high-density bodies are to be realized in the practice of this invention. The strength of the bond between the particles making up the agglomerates varies considerably between batches and even within a given batch of powder. Also, the size of particles making up the agglomerates varies considerably. Where the bond strength is low, the agglomerates break down readily by milling, either wet or dry. A few seconds of high speed ball milling is sufficient to affect this deagglomeration. Longer times may be necessary to break down agglomerates having higher bond strengths. The variation in particle size distribution in the various batches of powder is usually due to variations in the control of the chemical preparation of the powder. These variations in turn determine the processing steps required as indicated in the various embodiments of this invention described above to process the powder further for pressing or forming the green unsintered shapes. Because of these inconsistencies in the refractory powder material, the powder batches usually require some processing to provide a powder suitable for body forming at low compacting pressures to green shapes having high density without "spring back" cracking. Such shapes shrink uniformly to within dimensional tolerances to sintered bodies of 94 percent to 100 percent of theoretical density at minimum sintering temperatures and times. The powder must be dispersed into separate particles of maximum density, that is, the agglomerates must be broken down, in order to lower the compacting pressures required to obtain maximum densification and uniform shrinkage during sintering. The milling operations described break down the agglomerates of particles and prevent the formation of voids in the green unsintered pressed compact which are too large to disappear during sintering.

POWDER MILLING

Both wet and dry milling can be used in the process of this invention for feed powder deagglomeration. The process thus is independent of powder sources and capable of handling any type of salvage or reclaim (soft or hard scrap) so that all powder as received can be processed into the final high density product. Milling tests were conducted on a wide variety of refractories, and both wet and dry. Dry milling is preferred since it apparently produces a more desirable particle size distribution and higher density unsintered bodies. Tests were made in tungsten carbide lined mills with tungsten carbide grinding balls. Contamination of the powder with tungsten can be controlled below the 100 p.p.m. permissible limit primarily by limiting the time of milling to less than about 1200 minutes. Elimination of this contamination can be effected by employing milling equipment constructed of materials which are not considered a contaminant of the particular powder. For example, aluminum lined mills with stainless steel balls were satisfactory for milling nuclear fuel powders. Results are satisfactory for either wet or dry milling. For wet milling, acetone was employed as the milling medium, although other liquid media including benzene, petroleum ether, a benzene-paraffin binder solution, an acetone-paraffin binder slurry, and others were also investigated and found to be satisfactory.

Milling time was found to be dependent upon the composition and condition of the feed powder and the kind of milling equipment. For a given powder, longer milling times are required in an aluminum mill with stainless steel balls to achieve the same degree of deagglomeration and dispersion as obtained in the tungsten carbide mill. With aluminum mills, the high-speed type of commercial milling equipment can be employed, effectively reducing milling time, either wet or dry. Still longer milling times in lower speed carbide mills are, however, required to deagglomerate some of the powders which are hard and abrasive, for example, some of the carbides and oxides.

It was found from analysis of pellets before and after sintering that the aluminum contamination picked up in the powder processing can very easily be kept to unobjectionable levels. Further, it was found that after the mill had been in operation, the aluminum surface became impregnated with powder, thereby reducing the pick up of aluminum. It appeared that the amount of aluminum picked up by the powder during milling was reduced during sintering. Also it appeared that some aluminum combined with oxygen evolved during the sintering step.

The powder contamination during milling permits the addition of certain elements, such as iron, to processed powder by making either part or all parts of the mill exposed to the powder of the materials desired to be added. For example, in a ball mill, small controlled quantities of iron may be added through a process of wear of iron grinding balls used in addition to the stainless steel balls in an aluminum lined mill.

The preferred milling equipment in which the powder deagglomeration and precompacting is effected is the high speed ball mill utilizing a planetary motion of plural, usually four, jars spaced around the axis of rotation. Preferably the jars are filled two-thirds full with equal volumes of loose powder and grinding balls. One typical apparatus has four 8 inch inside diameter aluminum jars spaced 90 degrees apart and rigidly supported on a 28 inch diameter carriage turning 250 r.p.m. There is a high centrifugal force generated forcing the powder and the balls into a sliding or rolling contact with the mill wall. In such equipment, commercial uranium dioxide powder is sufficiently deagglomerated in about 1.5 minutes and a precompacted cake forms on the mill wall during further milling.

LUBRICANT-BINDER

Paraffin wax was determined to be the most desirable lubricant-binder after investigation of the materials conventionally used in the known powder metallurgy arts. It is readily available in highly refined form and can be modified through the incorporation of additive materials such as residual oil, benzene, acetone, other natural and synthetic waxes, and the like. This material serves as a friction reducing lubricant to facilitate the formation of the green unsintered shapes or bodies. Further, it serves as a temporary binder for clustering the dispersion milled powder into generally spherical granules of proper size and shapes in the granulation step described below. The paraffin may be added in various ways, such as in liquid or molten condition, in a suitable solvent such as benzene, or in solid form. The liquid or solution forms as previously described present problems of temperature control, wax solidification, dispersion, and solvent recovery. The particular process for producing and handling paraffin wax flour, as described above in connection with FIGURE 1, is thus preferred in the practice of this invention.

PARTICLE SIZE DISTRIBUTION

As shown in FIGURE 7, proper particle size distribution in the powder is required to produce final sintered shapes of near 100 percent of theoretical density. By controlling the particle size of the powder so that the number of particles larger than 2.5 microns is less than about 4 percent of the number of particles larger than 0.1 micron and so that the ratio of the number of particles in the 0.1 to 0.8 micron fraction to the number of particles in the 0.8 to 2.5 micron fraction is greather than 3.0, high density bodies approaching 100 per cent of theoretical density are obtained after reasonably short sintering times from relatively high density unsintered bodies formed with low forming pressures. However, if the fine to coarse ratio is less than 3.0, green density drops, undesirably high body forming pressures are needed, sintering time is extended appreciably, and low density products result. It was found that the presence of not more than about 4 percent of particles larger than 2.5 microns is desirable in the powder treated in the process of this invention to minimize cracking of the unsintered body formed in the pressing step and to increase the permissible range of density of the unsintered bodies to the range described below.

GRANULATION AND BALLING

The granulation and balling operations consist of several steps to break up the mill cake or the slugs of pressed powder by forcing it through a screen of the desired mesh size. This operation is advantageously conducted at a temperature close to the wax binder melting point, or about 130° F., at which the material readily breaks down with slight force application on the screen through which it passes. The somewhat irregular shaped granules which result are vibrated, shaken, or otherwise agitated, as by barrel rolling to create a cascading action, and they become generally spherical or ball-shaped at these temperatures. These spherical granules are then sized as by screening to produce a fraction which gives the desired fill density and the rest is recycled for regranulation. The retained fraction is preferably that which, for a given refractory powder, gives a consistent fill density in a pellet press die cavity of at least 23 percent of the theoretical density, and preferably between about 27 percent and about 37 percent of theoretical density. A high fill density in this range will minimize the distance the plunger travels during pressing to obtain a sufficient density for the green unsintered body as described below, reduce the press pressures needed and minimize breakage of green pellets due to "spring back" resulting when low fill densities and higher press pressures are used in attempts to reach higher unsintered densities and low shrinkage values during the sintering step.

FORMING GREEN UNSINTERED BODIES

As indicated, several known procedures, including pellet pressing, extrusion pressing, and others, may be used to form the green unsintered bodies from the granular material described above. Conventional pellet pressing of the material according to this invention is preferably controlled to produce a green unsintered body or compact having a density at least 50 percent and preferably between about 54 percent and about 64 percent of the theoretical density of the particular refractory material involved. When green unsintered body formation is effected by extrusion pressing, lower densities down to about 40 to 45 percent of theoretical can be used and yield sintered products between 94 percent and 100 percent of theoretical density.

The body forming operation compacts the granulated powder into a single coherent mass of controlled density. Most powders having the particle sizes and the size fraction ratio previously described, exhibit a critical maximum pressure and a maximum green density to which they can be compacted without losing control of the density, integrity, and shape of the final sintered product. Pressure in excess of this maximum results in distortion and cracking of the pressed shape on ejection from the press. This is due to "spring back" or the effect of entrapped gas, or both, in the green pellet. The maximum pressure for pellet pressing is that at which a green density of about 65 percent of theoretical is approached or exceeded. Without the proper particle size ratio described above, the critical pressure is reached at much lower green densities and cracking or lower sintered densities result.

The use of deagglomerated processed powder having fine and coarse fraction ratios above 3.0 has made possible the pressing of green bodies to the required green densities of between about 54 percent and 64 percent of theoretical at substantially lower press pressures. Whereas up to 125 tons per square inch pressure is required to reach green densities in the 54 to 64 percent range without fine to coarse particle ratio control, only 2 to 20 tons per square inch pressure is found to be required when such ratio control is practiced according to this invention.

PRESINTERING

The removal of the paraffin wax base lubricant-binder prior to the higher temperature final sintering step must be handled carefully to avoid decomposition of the paraffin, otherwise a carbonaceous residue may form in the body or at the surface of the body. If the paraffin is not completely removed before the final sintering step, it can cause cracking and distortion of the pellet during sintering due to sealing of the body pores before escape of the volatile binder products. In the presintering or deparaffinizing step of the process of this invention, the rate of heating of the unsintered bodies is limited to values less than about 50° F. per minute, preferably about 40° F. per minute. The presintering temperatures range from about 400° F. to about 900° F.; complete deparaffinization can be effected in a vacuum at temperatures of 400° F. to 700°, presintering in the presence of a gas atmosphere require temperatures from about 700° F. to about 900° F. The time at which the bodies are held at the presintering temperature depends upon the size of the load in the furnace, the size of the individual bodies, the presence or absence of a gas atmosphere, and other factors. For example, for cylindrical pellets produced in a pellet press and which are between 0.5 and 0.7 inch in diameter and length, the deparaffinizing time is less than 30 minutes in a non-oxidizing hydrogen atmosphere at about 850° F.

Several typical atmosphere compositions suitable for use in the presintering step of this invention are described in detail later.

FINAL SINTERING

In the final high temperature sintering, the presintered fully deparaffinized refractory bodies are heated to the final sintering temperatures at rates no greater than about 175° F. per minute. During sintering the bodies may be packed in a granular refractory material to minimize thermal shock, control the rate of heating, and avoid chipping of the bodies being sintered. This granular packing material may be the same as or different from the material of which the body is made. However, it has been demonstrated that these refractory bodies can be satisfactorily sintered without such granular packing and the bodies being sintered may be contained in molybdenum boats, aluminum oxide boats, or the like, with or without such packing. The maximum sintering temperature needed to reach densities from 94 percent to 100 percent of theoretical can be varied between about 2200° F. and 3550° F. depending on the chemical composition of the material being sintered, the particle size of the feed powder, and upon the presence of certain small quantities of other elements present. For example, the incorporation of iron in quantities of about 0.25 percent by weight has been found to lower the necessary sintering temperature for uranium dioxide to about 2400° F. to produce sintered densities greater than 98 percent of theoretical. Without such additives, however, sintering temperatures for uranium dioxide range from about 2800° F. to 3200° F., and the same high densities may be reached.

Sintering time at the above-mentioned temperatures is dependent upon particle size and size distribution in that this determines the size of pores or voids in the green compacts. Dependent upon these pore sizes, sintering times range from about 30 minutes to as high as 75 hours. However, when the fine to coarse particle ratio and the particle sizes are controlled as previously indicated, and the fill density and green compact densities are observed as previously described, the sintering times range between 30 and 250 minutes at the sintering temperatures given above.

PRESINTERING AND SINTERING ATMOSPHERES

The atmosphere present during non-vacuum presintering and sintering must be chemically compatible with the material being sintered as well as with any packing material present to avoid undesirable reactions. For some materials a controlled vacuum atmosphere is either desirable or the only practical procedure. For others, highly purified inert gases such as helium, argon, or the other rare gases can be used. Nitrogen, carbon dioxide, and the like can be used in some instances. In many cases non-oxidizing atmospheres are required. Such is the case with the carbides, and some of the oxides such as uranium dioxide, for example. Non-oxiding gases suitable include gases such as hydrogen, mixtures of hydrogen and water vapor, hydrogen and ammonia, mixtures of ammonia, hydrogen and nitrogen, and the like. Carbonaceous gases such as carbon monoxide and dioxide are suitable as atmospheres for presintering and sintering the carbides to prevent carbon loss.

The procedures and critical limitations respecting powder particle size, fine to coarse particle ratio, fill density, green pressed density, and presintering conditions, particularly the maximum presintering temperature and the rate of heating to assure complete removal of the paraffin base binder prior to final sintering and to prevent binder decomposition, all apply in the application of the process of this invention to the production of other high density refractory bodies from appropriate powdered starting materials. Specifically, the particle sizes and the fine to coarse particle ratio of above about 3.0 described in connection with FIGURE 7 are applicable in the production of refractory materials having densities of 94 percent of theoretical and higher. The fill densities of above about 23 percent and preferably from 27 percent to 37 percent, and the green unsintered body densities of above about 40 percent and preferably from 54 percent to 64 percent of the theoretical density of the particular material are also directly applicable. The rate of heating of not greater than about 50° F. per minute to the maximum persintering or deparaffinizing temperature of 900° F. are applicable in general to the refractory and ceramic materials named.

However, the rate of heating to and the final sintering temperature, and other final sintering conditions such as atmosphere composition, time, pressure, and the like, are dependent upon the chemistry of the particular material being sintered. In the production of bodies of refractory metals such as tungsten, columbium, molybdenum, tantalum, and the like, and in the production of refractory carbides of uranium, thorium, titanium, tungsten, zirconium, hafnium, gadolinium, samarium, europium, erbium, dysprosium, tantalum, columbium, molybdenum, vanadium, and beryllium, for example, have all been successfully sintered in the process of this invention with particle size and ratio control to densities between 94 percent and 100 percent of theoretical at temperatures below the individual melting points and between 2200° F. and 3550° F. in a vacuum or in a controlled atmosphere. Plutonium carbide very probably can also be prepared. In gas atmospheres, these carbides are successfully sintered in the presence of sufficient carbon in an atmosphere to minimize carbon loss from the carbide. The metallic oxides, silicides, nitrides, and borides of these same metals have been sintered successfully according to this invention to these same high densities in the same temperature range using the procedures and critical limitations as described above. The effect of the addition of about 0.25 percent by weight of the iron group metals of the periodic table to reduce the sintering temperatures required to produce a given final density was also noted in sintering the aforementioned carbides, silicides, and borides. It was found with added iron, cobalt, or nickel, that final sintering temperatures in the range of from 2200° F. to 2650° F. were sufficient and that higher temperatures were not needed to reach final densities of 94 percent to 100 percent of theoretical in the case of the refractories listed above.

The theoretical densities of the various refractory or ceramic materials described herein are in general known and available in the published literature. They can also be determined experimentally from individual crystals or powders of the material by X-ray diffraction techniques to measure the crystallographic lattice constant from which the theoretical maximum density is calculated.

A particular embodiment of this invention has been described in considerable detail by way of illustration. It should be understood that various other modifications and adaptations thereof may be made by those skilled in this particular art without departing from the spirit and scope of this invention as set forth in the following claims.

I claim:

1. A process for producing a high density body from a powdered high melting point material selected from the class consisting of tungsten, columbium, molybdenum, tantalum, and the oxides, carbides, silicides, nitrides and borides of uranium, thorium, plutonium, titanium, tungsten, zirconium, hafnium, gadolinium, samarium, europium, erbium, dysprosium, tantalum, columbium, molybdenum, vanadium, and beryllium, which process comprises maintaining the ratio of the number of 0.1 to 0.8 micron particles to the number of 0.8 to 2.5 micron particles in the powdered material at a value of at least about 3.0, blending said powdered material with a lubricant-binder to form a free flowing mixture having a consistent fill density of at least about 23 percent of the theoretical density of said material, forming from said mixture a green body having a density of at least about 40 percent of theoretical, presintering said body at a temperature between about 400° F. and about 900° F. to remove said lubricant-binder, and finally sintering the presintered body at a temperature below its melting point and between about 2200° F. and about 3550° F. to produce said high density body having a density of from 94 percent to 100 percent of theoretical.

2. A process according to claim 1 wherein said lubricant-binder comprises paraffin wax, in combination with the steps of refrigerating said wax to increase the brittleness thereof, and subdividing the embrittled wax to produce wax flour prior to admixture with the powdered material.

3. A process according to claim 1 wherein said powdered material contains agglomerates of individual particles, in combination with the step of deagglomerating said agglomerates to disperse the individual particles from one another.

4. A process according to claim 1 in combination with step of maintaining in said powdered material less than about 4 percent of particles larger than 2.5 microns.

5. A process according to claim 1 wherein said ratio of at least about 3.0 is maintained by the steps of blending a fine powder having a high percentage of 0.1 to 0.8 micron particles with a coarse powder having a high percentage of 0.8 to 2.5 micron particles.

6. A process according to claim 1 in combination with the step of milling the mixture of powdered material and lubricant-binder at least once to form a precompacted cake, and granulating said cake to form generally spherical granules as said free-flowing mixture.

7. A process for producing a high density body from a powdered high melting point material selected from the class consisting of tungsten, columbium, molybdenum, tantalum, and the oxides, carbides, silicides, nitrides and borides of uranium, thorium, plutonium, titanium, tungsten, zirconium, hafnium, gadolinium, samarium, europium, erbium, dysprosium, tantalum, columbium, molybdenum, vanadium, and beryllium, which process comprises treating said powdered material to deagglomerate agglomerates of individual particles and disperse said particles from one another, maintaining the ratio of the number of 0.1 to 0.8 micron particles to the number of 0.8 to 2.5 micron particles in said powdered material at a value of at least about 3.0 and less than 4 percent of particles larger than about 2.5 microns, blending said powdered material with between about 0.5 percent and about 10 percent by weight of a paraffin wax base lubricant-binder flour to form a free flowing mixture having a consistent fill density of between about 27 percent and about 37 percent of the theoretical density of said material, forming from said mixture a green body having a density between about 54 percent and 64 percent of theoretical, presintering said body at a temperature between about 400° F. and about 900° F. to remove said lubricant-binder therefrom, and finally sintering said body at a temperature between about 2200° F. and about 3550° F. and below the melting point of said material to produce said high density body having a density of from 94 percent to 100 percent of theoretical.

8. A process according to claim 7 wherein said green body is heated at a rate below about 50° F. per minute to the presintering temperature, and wherein said body is heated at a rate below about 175° F. per minute to the final sintering temperature.

9. A process according to claim 7 in combination with the step of milling the mixture of paraffin wax flour and said powdered material at a temperature about equal to the melting point of said wax to precompact the mixture and form a cake, granulating said cake to form generally irregular shaped particles and fine particles, and agitating this mixture of particles at a temperature about equal to said melting point to agglomerate said fine particles and form generally spherical particles as said free flowing mixture.

10. A process for producing a high density body from powdered uranium dioxide which comprises refrigerating a paraffin wax base lubricant-binder to embrittle it, subdividing the embrittled wax to produce a wax flour, blending between about 0.5 percent and about 10 percent by weight of said wax flour with said powdered uranium dioxide to form a uniform blend, milling said blend at a temperature about equal to the melting point of said wax to deagglomerate and disperse individual particles of said powdered uranium dioxide to maintain the ratio of the number of 0.1 to 0.8 micron particles to the number of 0.8 to 2.5 micron particles in said blend at a value at least equal to 3.0 and to maintain therein less than 4 percent of particles larger than 2.5 microns and to precompact said blend, granulating the precompacted blend at a temperature about equal to said wax melting point to form a free flowing mixture having a consistent fill density of between about 27 percent and about 37 percent of the theoretical density of said powdered uranium dioxide, forming from said mixture a green body having a density between about 54 percent and about 64 percent of said theoretical density, heating said body at a rate below about 50° F. per minute to between about 400° F. and about 900° F. to remove said wax from said body, and further heating said body at a rate below about 175° F. per minute to between about 2200° F. and about 3550° F. and below the melting point of said powdered uranium dioxide to produce said high density body having a density of from 94 percent to 100 percent of theoretical.

11. A process for producing a high density body from powdered thorium oxide which comprises refrigerating a paraffin wax base lubricant-binder to embrittle it, subdividing the embrittled wax to produce a wax flour, blending between about 0.5 percent and about 10 percent by weight of said wax flour with said powdered thorium oxide to form a uniform blend, milling said blend at a temperature about equal to the melting point of said wax to deagglomerate and disperse individual particles of said powdered thorium oxide to maintain the ratio of the number of 0.1 to 0.8 micron particles to the number of 0.8 to 2.5 micron particles in said blend at a value at least equal to 3.0 and to maintain therein less than 4 percent of particles larger than 2.5 microns and to precompact said blend, granulating the precompacted blend at a temperature about equal to said wax melting point to form a free flowing mixture having a constant fill density of between about 27 percent and about 37 percent of the theoretical density of said powdered thorium oxide, forming from said mixture a green body having a density between about 54 percent and about 64 percent of said theoretical density, heating said body at a rate below about 50° F. per minute to between about 400° F. and about 900° F. to remove said wax from said body, and further heating said body at a rate below about 175° F. per minute to between about 2200° F. and about 3550° F. and below the melting point of said powdered thorium oxide to produce said high density body having a density of from 94 percent to 100 percent of theoretical.

12. A process for producing a high density body from powdered plutonium oxide which comprises refrigerating a paraffin wax base lubricant-binder to embrittle it, subdividing the embrittled wax to produce a wax flour, blending between about 0.5 percent and about 10 percent by weight of said wax flour with said powdered plutonium oxide to form a uniform blend, milling said blend at a temperature about equal to the melting point of said wax to deagglomerate and disperse individual particles of said powdered plutonium oxide to maintain the ratio of the number of 0.1 to 0.8 micron particles to the number of 0.8 to 2.5 micron particles in said blend at a value at least equal to 3.0 and to maintain therein less than 4 percent of particles larger than 2.5 microns and to precompact said blend, granulating the precompacted blend at a temperature about equal to said wax melting point to form a free flowing mixture having a consistent fill density of between about 27 percent and about 37 percent of the theoretical density of said powdered plutonium oxide, forming from said mixture a green body having a density between about 54 percent and about 64 percent of said theoretical density, heating said body and rate below about 50° F. per minute to between about 400° F. and about 900° F. to remove said wax from said body, and further heating said body at a rate below about 175° F. per minute to between about 2200° F. and about 3500° F. and below the melting point of said powdered plutonium oxide to produce said high density body having a density of from 94 percent to 100 percent of theoretical.

13. A method for producing a high density body from powdered uranium dioxide which comprises refrigerating a paraffin wax base lubricant-binder to embrittle it, subdividing the embrittled wax to produce a wax flour, blending between about 0.5 percent and about 10 percent by weight of said wax flour with said powdered uranium dioxide to form a uniform blend, milling said blend at a temperature about equal to the melting point of said wax to deagglomerate and disperse individual particles of said uranium dioxide and maintain the ratio of the number of 0.1 to 0.8 micron particles to the number of 0.8 to 2.5 micron particles in said blend at a value at least equal to 3.0 and maintain therein less than 4 percent of particles larger than 2.5 microns and to precompact said blend, granulating the precompacted blend at a temperature about equal to said wax melting point to form a free flowing mixture having a consistent fill density between above about 2.5 gm./cc., forming from said mixture a green body having a density between above about 5.9 gm./cc. and about 7.0 gm./cc., heating said body at a rate below about 50° F. per minute to between about 700° F. and about 900° F. in a non-oxidizing atmosphere to remove said wax from said body, and further heating said body at a rate below about 175° F. to a temperature between about 2750° F. and about 3250° F. for between about 30 and 250 minutes in a non-oxidizing atmosphere to produce a sintered body of uranium dioxide having a density of between about 94 percent and 100 percent of theoretical.

14. A process according to claim 13 in combination with the step of agitating said granulated blend at a temperature about equal to said wax melting point to agglomerate fine particles and produce generally spherical particles in said free flowing mixture.

15. A process according to claim 13 wherein said temperature about equal to the wax melting point is about 130° F.

16. In a process for producing a sintered high density body from powdered high melting point material selected from the class consisting of tungsten, columbium, molybdenum, tantalum, and the oxides, carbides, silicides, nitrides, and borides of uranium, thorium, plutonium, titanium, tungsten, zirconium, hafnium, gadolinium, samarium, europium, erbium, dysprosium, tantalum, columbium, molybdenum, vanadium, and beryllium, which process comprises blending the powdered material with a paraffin wax base lubricant-binder to form a uniform mixture, forming from said uniform mixture a green unsintered body, and sintering said body to produce a high density product, the improvement which comprises milling said blend of powdered material and wax binder at a temperature of about equal to the melting point of said wax to precompact said blend and form a cake, granulating said cake to form generally irregularly shaped particles and fine particles, and agitating this mixture of particles at a temperature of about equal to said melting point to agglomerate said fine particles and form generally spherical shaped particles as said uniform mixture from which said green unsintered body is formed.

17. In a process for producing a sintered high density body from a powdered high melting point material selected from the class consisting of tungsten, columbium, molybdenum, tantalum, and the oxides, carbides, silicides, nitrides, and borides of uranium, thorium, plutonium, titanium, tungsten, zirconium, hafnium, gadolinium, samarium, europium, erbium, dysprosium, tantalum, columbium, molybdenum, vanadium, and beryllium, which process comprises blending the powdered material with a lubricant-binder to form a uniform mixture, forming from said uniform mixture a green unsintered body, and sintering said body to produce a high density product, the improvement which comprises maintaining the ratio of the number of 0.1 to 0.8 micron particles to the number of 0.8 to 2.5 micron particles at a value of at least about 3.0 and less than about 4 percent of particles larger than 2.5 microns, screening and agitating said uniform mixture to give it a consistent fill density of at least about 23 percent of the theoretical density of said material, and controlling the pressure of formation of said green unsintered body to maintain its density at a value at least about 40 percent of said theoretical density.

18. A process according to claim 17 wherein said fill density is maintained between about 27 percent and 37 percent of said theoretical density, and the density of said green unsintered body is maintained between about 54 percent and 64 percent of said theoretical density.

19. In a process for producing a sintered high density body from powdered high melting point material selected from the class consisting of tungsten, columbium, molybdenum, tantalum, and the oxides, carbides, silicides, nitrides and borides of uranium, thorium, plutonium, titanium, tungsten, zirconium, hafnium, gadolinium, samarium, europium, erbium, dysprosium, tantalum, columbium, molybdenum, vanadium, and beryllium, which process comprises blending the powdered material with a paraffin wax base lubricant-binder to form a uniform mixture, forming from said uniform mixture a green unsintered body, and sintering said body to produce a high density product, the improvement which comprises maintaining the ratio of the number of 0.1 to 0.8 micron particles to the number of 0.8 to 2.5 micron particles at a value of at least about 3.0 and less than about 4 percent of particles larger than 2.5 microns, screening and agitating said uniform mixture to give it a consistent fill density of at least about 23 percent of the theoretical density of said material, and controlling the pressure of formation of said green unsintered body to maintain its density at a value at least about 40 percent of said theoretical density.

20. A process according to claim 19 wherein said fill density is maintained between about 27 percent and 37 percent of said theoretical density and the density of said green unsintered body is maintained between about 54 percent and 64 percent of said theoretical density.

References Cited in the file of this patent

UNITED STATES PATENTS

| | | |
|---|---|---|
| 346,447 | Vose | July 27, 1886 |
| 441,951 | Goetz | Dec. 2, 1890 |
| 2,298,885 | Hull | Oct. 12, 1942 |
| 2,347,464 | Cuno | Apr. 25, 1944 |
| 2,753,621 | Wellborn | July 16, 1956 |
| 2,857,270 | Brundin | Oct. 21, 1958 |
| 2,928,733 | Wagner | Mar. 15, 1960 |

FOREIGN PATENTS

| | | |
|---|---|---|
| 732,618 | Great Britain | July 29, 1955 |